United States Patent
Chen et al.

(10) Patent No.: US 9,772,826 B2
(45) Date of Patent: Sep. 26, 2017

(54) BUILD-TIME RESOLVING AND TYPE CHECKING REFERENCES

(71) Applicant: Microsoft Technology Licensing, LLC, Redmond, WA (US)

(72) Inventors: Wen-Ke Chen, Redmond, WA (US); Jinsong Yu, Bellevue, WA (US); Alexander P. Riemann, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/046,826

(22) Filed: Oct. 4, 2013

(65) Prior Publication Data

US 2015/0100947 A1    Apr. 9, 2015

(51) Int. Cl.
*G06F 9/45* (2006.01)
*G06F 9/54* (2006.01)

(52) U.S. Cl.
CPC ............... *G06F 8/43* (2013.01); *G06F 8/423* (2013.01); *G06F 9/541* (2013.01)

(58) Field of Classification Search
CPC ............ G06F 8/43; G06F 8/423; G06F 9/541
See application file for complete search history.

(56) References Cited

U.S. PATENT DOCUMENTS

| | | | |
|---|---|---|---|
| 5,889,992 A | 3/1999 | Koerber | |
| 7,797,688 B1 | 9/2010 | Dubagunta | |
| 8,798,092 B2 * | 8/2014 | Schleifer et al. | 370/463 |
| 2008/0005728 A1 * | 1/2008 | Morris | 717/153 |
| 2011/0219446 A1 | 9/2011 | Ichnowski | |
| 2012/0185824 A1 * | 7/2012 | Sadler et al. | 717/120 |
| 2013/0080505 A1 | 3/2013 | Nielsen et al. | |
| 2013/0125101 A1 * | 5/2013 | Pamer | G06F 8/437 717/141 |

FOREIGN PATENT DOCUMENTS

WO    2008005727 A1    1/2008

OTHER PUBLICATIONS

Van Engelen, et al., "Developing web services for C and C++", IEEE Internet Computing, vol. 7, Issue 2, Mar. 2003 10 Pages.
(Continued)

*Primary Examiner* — Li B Zhen
*Assistant Examiner* — Amir Soltanzadeh
(74) *Attorney, Agent, or Firm* — Workman Nydegger

(57) ABSTRACT

Build-time resolution and type-enforcing of corresponding references in different code that references the same value. In response to detecting a directive within the code itself that a first reference in first code is to be correlated with a second reference in second code, and in response to detection that the types of the references are the same, a code generation tool generates correlation code that is interpretable to a compiler as allowing a value of a type of the first reference of a compiled-form of the first code to be passed as the same value of the same type of the second reference of a compiled-form of the second code. The first code, the second code, and the generated correlation code may then be compiled. If compilation is successful, this means that the first and second references are already properly resolved as referring to the same value and type-enforced.

20 Claims, 4 Drawing Sheets

(56) References Cited

OTHER PUBLICATIONS

"International Search Report & Written Opinion Issued in PCT Patent Application No. PCT/US2014/058505", Mailed Date: Dec. 23, 2014, 13 Pages.

"International Preliminary Report on Patentability Issued in PCT Application No. PCT/US2014/058505", Mailed Date: Dec. 3, 2015, 8 Pages.

"Second Written Opinion Issued in PCT Application No. PCT/US2014/058505", Mailed Date: Sep. 4, 2015, 7 Pages.

Chlipala, Adam, "Ur: Statically-Typed Metaprogramming with Type-Level Record Computation", In Proceedings of Conference on Programming Language Design and Implementation, Jun. 5, 2010, 12 pages.

Chlipala, Adam, "Scrap Your Web Application Boilerplate—or Metaprogramming with Row Types", In Technical Report No. UCB/EECS-2006-120, Sep. 29, 2006, 15 pages.

Tost, Andre, "Loosely Typed Versus Strongly Typed Web Services", Published on: Sep. 2, 2005, Available at: http://www.ibm.com/developerworks/webservices/library/ws-loosevstrong/index.html.

"Exchange Web Services Architecture", Published on: Jul. 31, 2012, Available at: http://msdn.microsoft.com/en-us/library/exchange/aa579369(v=exchg.140).aspx.

Gunjan et al., "Web Services and Application Frameworks (.NET and J2EE)", In White Paper of National Oceanic and Atmospheric Administration, Jan. 2008, 14 pages.

"Chapter 21: Designing Web Applications", Published on: Oct. 19, 2009, Available at: http://msdn.microsoft.com/en-us/library/ee658099.aspx.

\* cited by examiner

BUILD-TIME RESOLVING AND TYPE CHECKING REFERENCES

BACKGROUND

Computers and computing systems have affected nearly every aspect of modern living. Computers are generally involved in work, recreation, healthcare, transportation, entertainment, household management, and so forth. Computing systems are providing ever more complex and sophisticated functionality. Such functionality is often primarily driven by underlying software, which itself is becoming ever more complex. Application developers have the task of developing such software, and to tune performance to ensure efficient and secure operation.

Web applications are often designed and implemented following a client-server computing model. This model usually provides that core application logic is executed on remote servers, execution results are accessed through clients (e.g., web browsers), and client code communicates with server code using an application-layer protocol (e.g., HTTP). Execution of a web application on a server is often driven by a component that takes and parses inputs received from clients, dispatches requests with recognized input parameters to respective business-logic components for processing, and then produces outputs to be sent back to clients. The produced output also usually determines what inputs an application is going to receive subsequently. Such components are generally developed using a domain language which is different from the programming language used to develop other components of the application. This discrepancy can oftentimes lead to semantic gaps between code parsing inputs and code producing outputs, as well as different identifiers being used to refer to the same object in different components.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein refer to a build-time mechanism for resolving and type-enforcing of corresponding references in different code that references the same value. The two code sections are analyzed and, as a result, a directive is detected that the first reference in first code is to be correlated with a second reference in second code so that they both refer to the same data. In response to that detected directive, if the types of the first and second references are compatible, a code generation tool automatically generates correlation code that is interpretable to a compiler as allowing a value of a type of the first reference of a compiled-form of the first code to be passed as the same value of the same type of the second reference of a compiled-form of the second code.

The first code, the second code, and the generated correlation code may then be compiled. If compilation is successful, this means that the first and second references are already properly resolved as referring to the same value, with proper type-enforcement also occurring at build-time. Accordingly, when the compiled code is run, no further computing resources need be used to correlate the two references, or ensure that their types are compatible. Thus, a semantic gap between the two codes is bridged at build-time, rather than at run-time.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein refer to a build-time mechanism for resolving and type-enforcing of corresponding references in different code that references the same value. The two code sections are analyzed and, as a result, a directive is detected that the first reference in first code is to be correlated with a second reference in second code so that they both refer to the same data. In response to that detected directive, if the types of the first and second references are compatible, a code generation tool automatically generates correlation code that is interpretable to a compiler as allowing a value of a type of the first reference of a compiled-form of the first code to be passed as the same value of the same type of the second reference of a compiled-form of the second code.

The first code, the second code, and the generated correlation code may then be compiled. If compilation is successful, this means that the first and second references are already properly resolved as referring to the same value, with proper type-enforcement since the build occurs after checking the types of the corresponding references. Accordingly, when the compiled code is run, no further computing resources need be used to correlate the two references, or ensure that their types are compatible. Thus, a semantic gap between the two codes is bridged at build-time, rather than at run-time.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
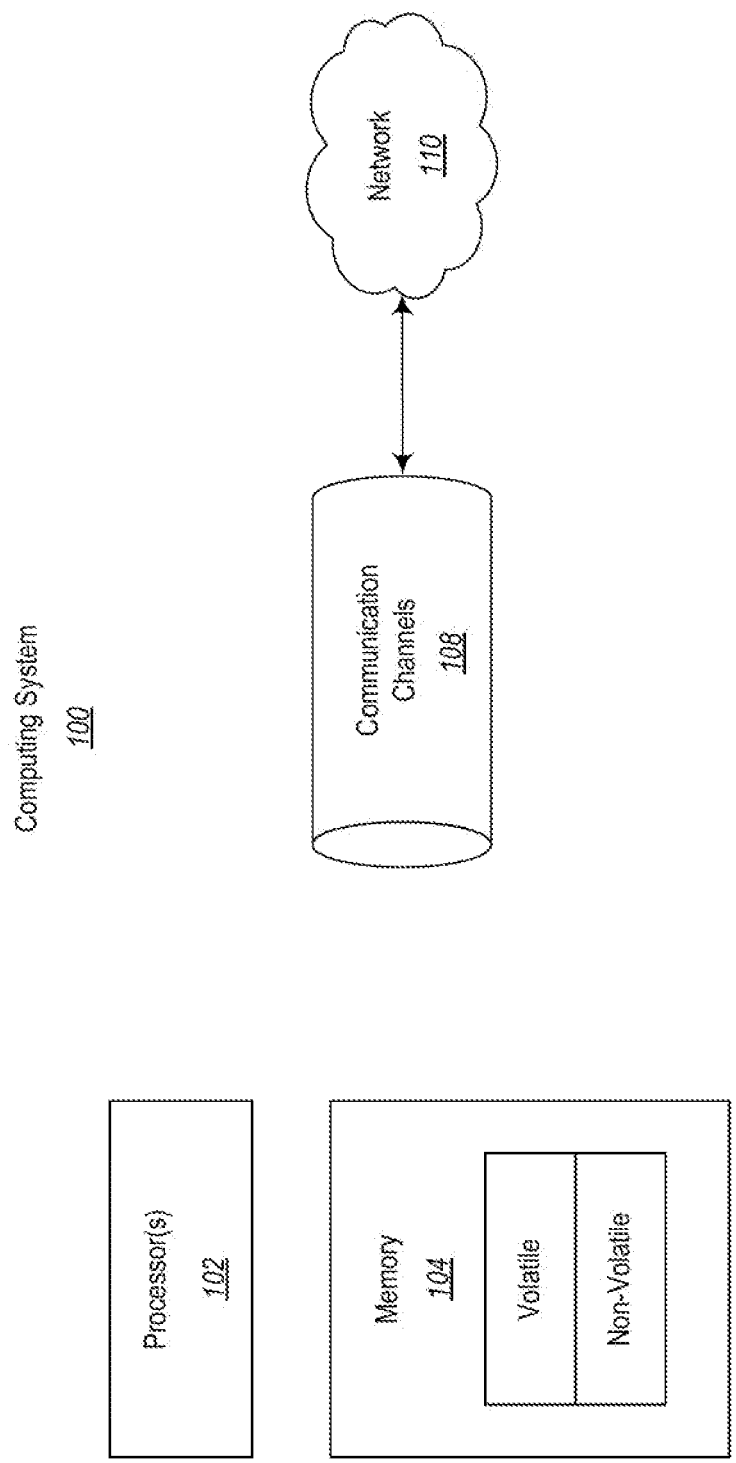
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
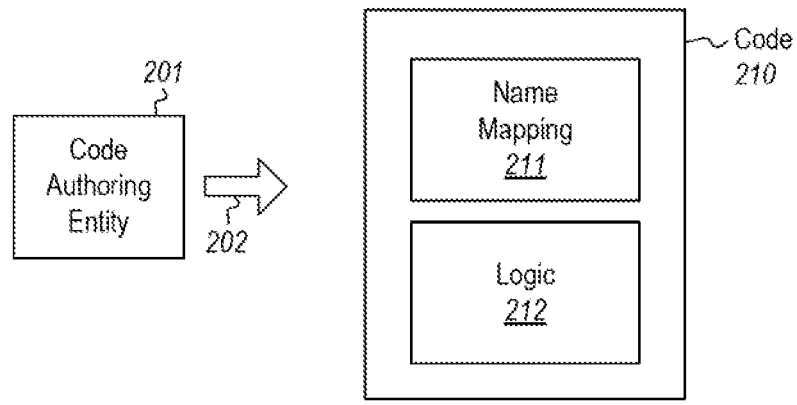
FIG. 2 illustrates programming time environment in accordance with the principles described herein, in which a code authoring entity provides information regarding name mappings into code.

FIG. 2 illustrates programming time environment 200 in accordance with the principles described herein. At program time, a code authoring entity 201 authors code 210 (as represented by arrow 202) that includes a name mapping 211 between one or more references in the first code and one or more references in second code that represent the same data. In this description and in the claims, two pieces of data are the same if they are identical or substantially the same in that one piece of data represents the material substance of the other piece of data. For instance, one piece of data might represent pi to three thousand significant digits. The other piece of data might represent pi to three significant digits. The data are substantially the same in that they both are reasonable representations of the irrational number pi.

The code 210 may be, for example, source code that is amenable to authoring by human beings. In that case, the code authoring entity 201 might be a human programmer. However, code generation may also be done in an automated fashion by a computing entity, such as, for example, other executable code, such as a program, component, procedure, object, function, method, or the like.

In one embodiment, the name mapping 211 may be provided in the form of attributes, headers, keywords, documentation, or the like, so long as the name mapping 211 remains available at build-time, when the code is rendered into intermediate format or binary format so as to be recognizable and interpretable to a build-time tool, such as a compiler.

Figure 3:
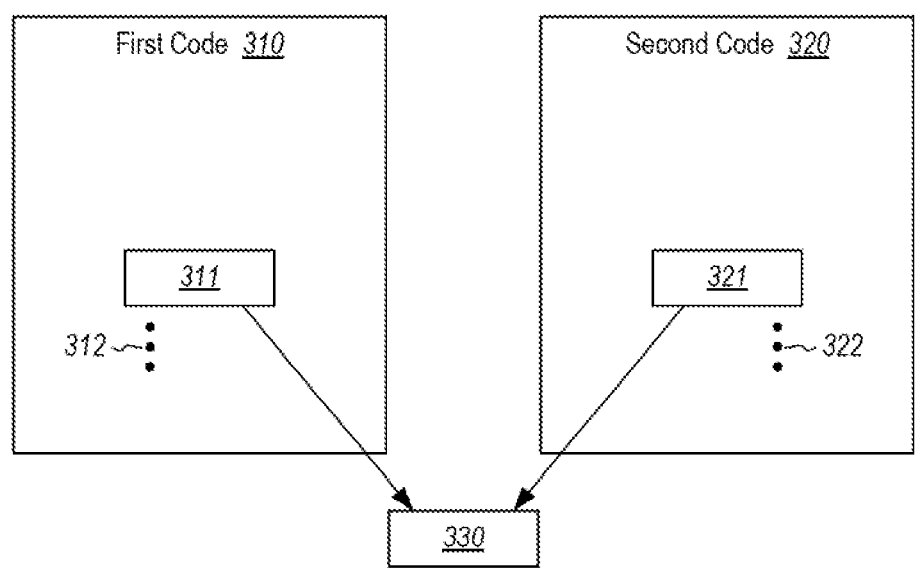
FIG. 3 illustrates an environment in which two different pieces of code include references that are semantically different, but refer to the same, or substantially the same, data.

As mentioned above, the name mapping 211 serves to provide a correlation between references in semantically different code portions such that they may be understood by a compiler, at build time, to refer to the same data. For instance, FIG. 3 illustrates an environment 300 that includes first code 310 and second code 320 and data 330. The first code 310 includes a reference 311 to the data 330. The second code 320 includes another reference 321 to the data 330. However, because the two codes 310 and 320 use different semantics when referring to the same data 330, the references 311 and 321 are themselves different from each other.

FIG. 3 illustrates just a single reference 311 or 321 corresponding to each code 310 and 320 that references the same piece of the data. However, the ellipses 312 represent that there may be two or more references in the first code 310 that when viewed together refer to the same data 330 as the reference 321 in the second code 311. Likewise, the ellipses 322 represent that there may be two or more references in the second code 320 that when viewed together refer to the same data 330 as the reference 311 in the first code. Finally, the ellipses 312 and 322 may be collectively viewed to represent that there may be two or more references in the first code 310 that when viewed together refer to the same data 330 as two or more references in the second code 320 when viewed together.

Although not required, a transformation may be used when referring to one of the references 311 as compared to the other reference 312. For instance, the transform might be a simple transform to convert the value expressed in metric units (e.g., a kilometer) that are referred to in the first code 310 to the value expressed in other British units (e.g., a mile).

There are a variety of circumstances in which semantically different code may have different references to refer to the same data. For instance, the first code 310 and the second code 320 may be drafted using different programming languages. The first code 310 may thus be drafted using a first programming language, whereas the second code 320 may thus be drafted using a second different programming language. This is done in certain environments in which the characteristics of the different programming languages are best suited to the function accomplished by the code, and/or the environment in which the code runs.

As an example, the first code 310 might be for performing input/output processing (often referred to as "I/O processing" or "front end"), whereas the second code 320 might be for performing response generation (often referred to as "business logic" or "back end"). The second code 320 might sometimes be rendered in more declarative form, declaring how the output should be presented, rather than the exact procedure for accomplishing the result. An example of declarative languages is markup language. The first code 310 might sometimes be rendered in more imperative form, in which commands are given with respect to specific operation on data. The two types of languages are often semantically different, and may thus refer to the same, or substantially the same, data using different references.

The code 210 may include other logic 212. For instance, although not required, the logic 212 might be either the first code 310 or the second code 320 perhaps in uncompiled form. Thus, the code authoring entity 201 may have a sematic understanding of the meaning of the name in the first code, and have a semantic understanding of the second code at least to the point of being able to semantically equate the two names in the different codes.

Figure 4:
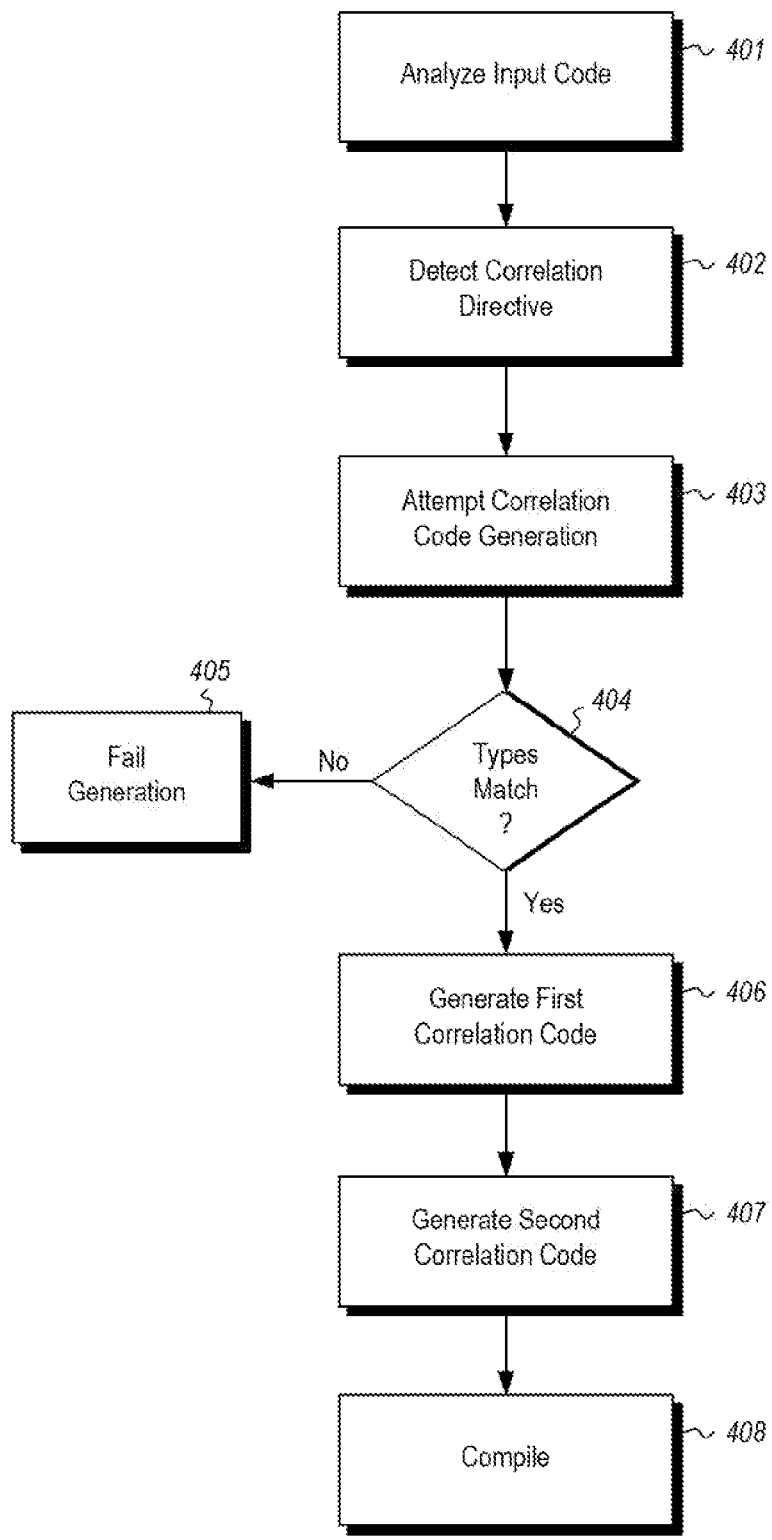
FIG. 4 illustrates a flowchart of a build-time method for resolving and type enforcing of references.
Figure 5:
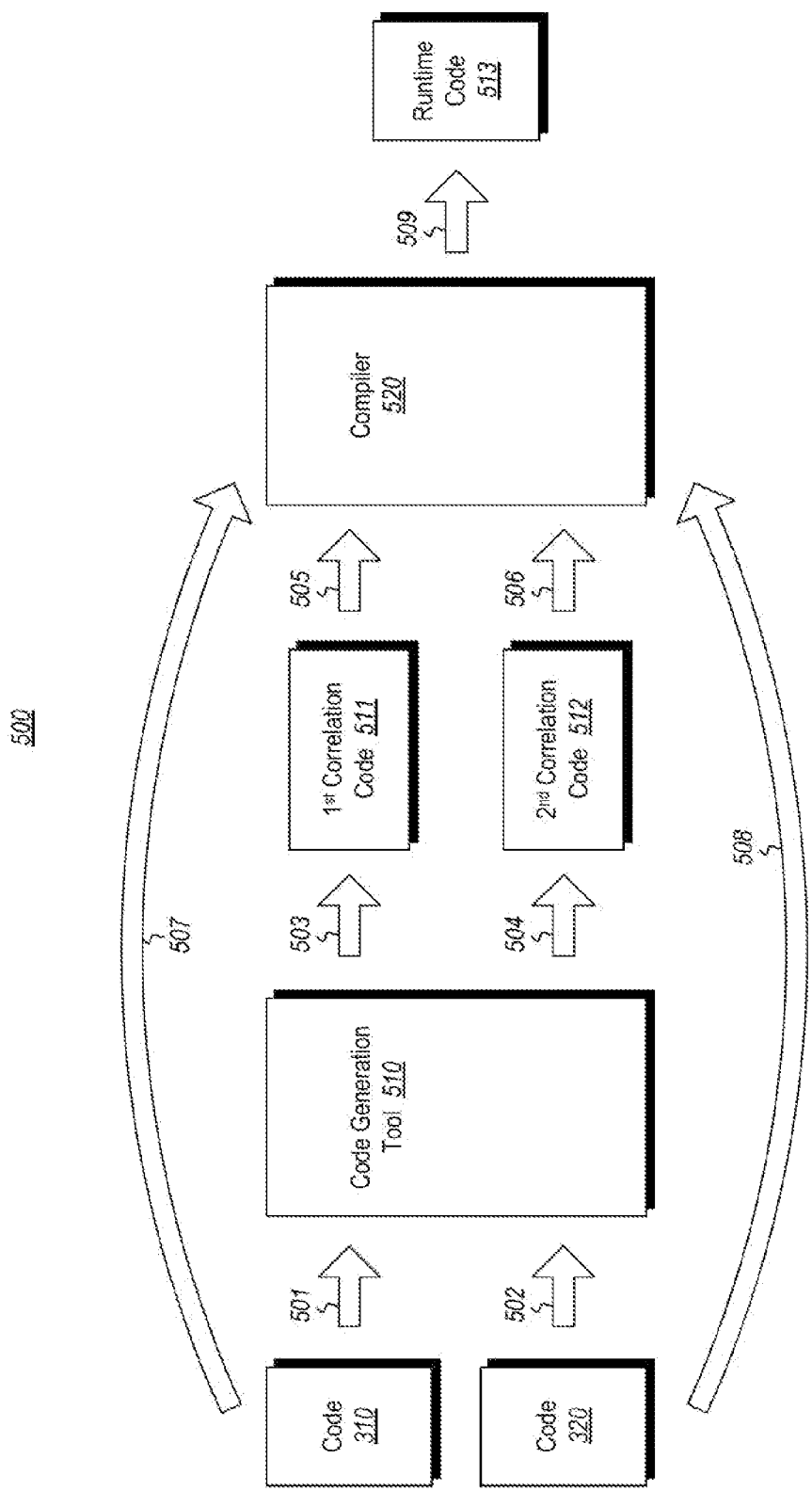
FIG. 5 illustrates a build-time environment in accordance with the principles described herein.

FIG. 4 illustrates a flowchart of a method 400 for performing build-time resolving and type enforcing of references in accordance with the principles described herein. In this description and within the claims, "build-time" refers to the time that code is compiled into binary machine-executable code and the steps leading up to the preparation of the code for compiling. Accordingly, "build-time" may also refer to times prior to compilation when the code is being prepared for compilation. That said, compilation itself often involves multiple passes, and each of those passes occur during "build-time" as the term is defined herein. In one embodiment, the method 400 may be performed by a code generation tool that automatically generates additional code based on input code, so that the input code and the generated code may be compiled together. For instance, FIG. 5 illustrates a build environment 500 that includes a code generation tool 510. As the method 400 may be performed by the code generation tool 510, the method 400 will now be described with reference to the environment 500 of FIG. 5.

The code generation tool analyzes input code (act 401) to identify references that are to be correlated. For instance, the code generation tool 510 is illustrated as receiving the first code 310 (as represented by arrow 501) and the second code 320 (as represented by arrow 502) of FIG. 3. Recall again that the first code 310 includes a first reference 311 and the second code 320 includes a second reference 321.

As a result of this analysis (act 401), the code generation tool then detects an instruction (act 402) that the first reference is to be correlated with the second reference such that they both refer to the same data. For instance, if the code 310 (and/or the code 320) were an example of the code 210 of FIG. 2, the name mapping 211 may be interpreted to the instruction as the code generation tool is analyzing the code 310 (and/or the code 320).

A specific concrete example of the code 310 and the code 320 will now be provided for illustrative purposes only, and not to limit the principles described herein. For instance, the following represents code for input/output code, which is an example of the code 310 (line numbering is added for clarity).
1. Template code (front end code):
2. @init(int id, string name)
3. Welcome @name, your id number is @id Line 1 merely identifies that this code is template code, which is code used for interfacing with the client. Line2 indicates that when the constructor is invoked that is created through compilation of the template code, the constructor is to create an instance of the input/output code with the input value called "id" of type "int", and with the input value called "name" of type "string". Line 3 indicates that when that instance of the input/output code is run, the user will be presented with a welcome message that includes both the name and the corresponding id.

The following represents example corresponding back-end code, which is an example of the code 320 (line numbering is added for clarity).

| 4. | Back End Code: |
|---|---|
| 5. | internal void DisplayUserId(string username) |
| 6. | { |
| 7. |   int userId; |
| 8. |   // ... Looks up the userId |
| 9. |   Views.DisplayUserId(userId, username); |
| 10. | } |

Line 4 introduces the back-end code. Line 5 declares the name of the action DisplayUserId, which receives a string called "username" as an input parameter. The imperative code associated with the action DisplayUserId is listed from lines 6 through 10. At line 7, a variable called "userId" is declared of type int. At line 9 (as described in the commentary of line 8), a method called View.DisplayUserId is called, which receives the two parameters including userId previously declared of type int in line 7, and including "username" of type string passed into the DisplayUserId action in line 5.

As part of the analysis (act 401), the code generation tool 500 looks for keywords, metadata, and/or any other information within the code 310 and/or 320 in order to identify the directive (act 402) to correlate references. The directive includes all of the information necessary to bridge the semantic gaps and type-check references at build-time. For instance, in the above example from lines 1 through 10, the code generation tool 500 determines that the references in the code 310 and the references in the code 320 need to be correlated via implicit or explicit directives included within the code 310 and/or 320. For instance, the code generation tool 500 might look at an implicit directive such as the name "DisplayUserId.cshtml", or may evaluate an explicit directive. For instance, that explicit directive might be "@init" in code 310 that includes information about "Views.DisplayUserId" used somewhere else or some attribute attached to "Views.DisplayUserId" in the code 320. This will provide information about where to find the relevant template code like the file name. From this, the code generation tool may realize that there are two pairs of parameters that are to be correlated, and which may be done by defining a View class. First, the parameters "id" and "userId" are to be correlated to refer to the same data of type "int", and the parameters "name" and "username" are to be correlated to the same data of type "string".

Thus, the directive to perform this mapping is automatically identified based on analysis of the code 310 and the code 320. Without this automated process, the programmer might have to write the following in the template code 310:
@{int id=(int)ViewData["userId"];}
@{string name=(string)ViewData["userName"];}
and the following in place of "View.DisplayUserId(userId, username) somewhere else:
ViewData["userId"]=userId;
ViewData["userName"]=username;
Views.DisplayUserId( );
This disadvantage of having to use such additional code is that it can be less efficient to execute, and hard to debug and maintain.

In response to the detection of the directive to correlate references to refer to the same data (act 402), the code generation tool automatically attempts to generate correlating code that is interpretable to a compiler as allowing a value of a type of the first reference of a compiled-form of the first code to be passed as the same value of the same type of the second reference of a compiled-form of the second code (act 403). The act (403) is an "attempt" because the generation of the correlating code fails (act 405) if a type of the two references are not the same or at least are not compatible ("No" in decision block 404). Alternatively, the correlation code is generated, but in a manner that is not acceptable to a compiler. This failure is actually quite useful as it ensures that if the correlation code is generated and/or compiled, that the two references that are correlated are of the same type or at least of a compatible type. Thus, type checking is performed at build-time or prior to build-time, and need not be performed at run-time.

If the two references are of the same type or at least are of a compatible type ("Yes" in decision block 404), then the code generation tool does generate the correlating code (act 406). For instance, in FIG. 5, the code generation tool 510 is illustrated as generated first correlation code 511 as represented by arrow 503.

In the example of lines 1 through 10 outlined above, the code generation tool 500 might, for instance, generate the following code (with line numbering added):

| 11. | static class Views |
|---|---|
| 12. | { |
| 13. |   static public void DisplayUserId(int id, string name) |
| 14. |   { |
| 15. |     var template = new DisplayUserId_cshtml(id, name); |
| 16. |     template.Execute( ); |
| 17. |   } |
| 18. | } |

The generated code may be thought of as "glue" code, which connects the template code of lines 1 through 3, with the back-end code of line 9, in such a way that there the two pieces of code work smoothly together, and such that the two pairs of parameters are resolved at or before build-time to refer to their distinct data. Otherwise, code generation and/or compiling fails. In this example, line 16 represent that invoking of the template code and represents the interface with the template code. Line 11 through 13 may be considered to define the Views. DisplayUserId class that is referenced in line 9. Note that even though the parameter in line 9 is provided as "userId", the same parameter is referenced as "id" within the DisplayUserId object itself (see line 13). Furthermore, even though the parameter in line 13 is provided as "username", the same parameter is referenced as "name" in the DisplayUserId object itself (see line 13). Thus, the correlating code allows the two different references to be used to refer to the same data, and further serves to allow the template code to interface properly with the back-end code.

If code 310 and 320 are written in different languages, then the code generation tool also automatically generates a version of the code in the other language (act 407). Referring to FIG. 5, the code generation tool 510 generates (as represented by arrow 504) the second correlation code 512. For instance, lines 16 through 23 represent the correlating code written in declarative language (cshtml specifically). The following represents corresponding imperative code with line numbering added:

```
19.     class DisplayUserId_cshtml : AServerPage {
20.         readonly int id;
21.         readonly string name;
22.         public DisplayUserId_cshtml(int _id, string _name) {
23.             id = _id;
24.             name = _name;
25.         }
26.         void Execute( ) {
27.             HttpResponse.Write("Welcome ");
28.             HttpResponse.Write(name);
29.             HttpResponse.Write(", your id number is");
30.             HttpResponse.Write(id);
31.         }
32.     }
```

The DisplayUserId_Cshtml class (from lines 19 through 32) is the result of the conversion of the correlating code to imperative language (C# specifically in this example).

Once the correlating code is generated, the correlating code is compiled with the first code 310, and the second code 320 (act 408). Referring to FIG. 5, the compiler 520 receives (as represented by the arrow 507) the first code 310, receives (as represented by arrow 508) the second code 320, receives (as represented by the arrow 505) the first correlation code 511, and receives (as represented by the arrow 506) the second correlation code 512. The compiler 520 compiles all of this code together to thereby generate (as represented by arrow 509), the runtime code 513. For instance, the runtime code 513 might be binary code, or perhaps intermediate code, which requires one further step of compilation in the runtime environment.

This results in runtime code that is directly executable at runtime, and in which cross-referencing and lookups are not required for the runtime to understand that the two references refer to the same data, and in which type checking of the two references is also not required. Accordingly, runtime efficiency is improved for code portions that have semantic gaps that include different references to the same data, and in which types are enforced also at build time.

In the particular example, there were actually two pairs of parameters that were correlated and type-checked at build-time, resulting in the same correlation code. Alternatively or in addition, depending on where the pairs are found, different correlation code may be generated for each found pair. Also in the above example, two pieces of semantically different code that have different references to the same data. However, the principles described herein can be applied to situations in which there are three or more pieces of semantically different code that each includes different references to the same data. Accordingly, the principles described herein provide an effective mechanism for bringing the semantic gap between two different pieces of code that follow different semantics when referring to data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer program product comprising one or more computer-readable hardware storage devices having thereon computer-executable instructions that, when executed by one or more processors of a computing system, cause the computing system to perform a method of performing build-time resolving and type checking of references, the method comprising:

analyzing, prior to compilation, a first source code portion that contains a first reference to first data, the first source code portion being front-end imperative code;

analyzing, prior to compilation, a second source code portion that contains a second reference to second data, the first reference and the second reference being distinct and using different semantics, the second source code portion being back-end declarative code;

detecting through the pre-compilation analysis of the first source code portion and the second source code portion a directive that the first reference is to be correlated with the second reference so that the first reference to first data and the second reference to second data both refer to the same data; and in response to detecting the directive:

determining a type of the first reference and determining a second type of the second reference;

determining whether the first type of the first reference and the second type of the second reference are compatible types; and when the type of the first reference and the type of the second reference are compatible types, a code generation tool generating correlating code that is input to a compiler and interpretable by the compiler at a time the first source code portion, the second source code portion, and the generated correlating code are input to and complied by the compiler as allowing a value of the type of the first reference of a compiled form of the first source code to be resolved with type-checking and be passed as the same value of the type of the second reference of a compiled form of the second source code.

2. The computer program product in accordance with claim 1, further comprising determining that the type of the first reference and the type of the second reference are not compatible types and not generating the correlating code.

3. The computer program product in accordance with claim 1, further comprising determining that the type of the first reference and the type of the second reference are compatible types and generating the correlating code.

4. The computer program product in accordance with claim 3, the method further comprising:
compiling the first code, the second code, and the correlating code.

5. The computer program product in accordance with claim 3, wherein a first language of the first code is different than a second language of the second code.

6. The computer program product in accordance with claim 5, the correlating code being first generated as a first language version of the correlating code in the first language, the method further comprising:
generating a second language version of the correlating code in the second language.

7. The computer program product in accordance with claim 6, the method further comprising:
compiling the first code, the second code, the first language version of the correlating code, and the second language version of the correlating code.

8. The computer program product in accordance with claim 1, wherein the directive is associated with an attribute or keyword within either the first code or the second code.

9. A method of performing build-time resolving and type checking of references, the method comprising:
analyzing, prior to compilation, a first source code portion that contains a first reference to first data, the first source code portion being front-end imperative code;
analyzing, prior to compilation, a second source code portion that contains a second reference to second data, the first reference and the second reference being distinct and using different semantics, the second source code portion being back-end declarative code;
detecting through the pre-compilation analysis of the first source code portion and the second source code portion a directive that the first reference is to be correlated with the second reference so that the first reference to first data and the second reference to second data both refer to the same data;
in response to detecting the directive,
determining a type of the first reference and determining a second type of the second reference, and
determining that the type of the first reference and the second type of the second reference are compatible types; and
in response to detecting the directive and determining that the type of the first reference and the second type of the second reference are compatible types, a code generation tool automatically generating correlating code that is input to a compiler and interpretable to the compiler at a time the first source code portion, the second source code portion, and the generated correlating code are input to and complied by the compiler as allowing a value of the type of the first reference of a compiled form of the first source code to be resolved with type-checking and be passed as the same value of the type of the second reference of a compiled form of the second source code.

10. The method in accordance with claim 9, further comprising:
compiling the first code, the second code, and the correlating code.

11. The method in accordance with claim 9, wherein a first language of the first code is different than a second language of the second code.

12. The method in accordance with claim 11, wherein the first language is a declarative language, and the second language is an imperative language.

13. The method in accordance with claim 12, automatically generating correlating code comprising automatically generating a first language version of the correlating code in the first language, the method further comprising:
automatically generating a second language version of the correlating code in the second language.

14. The method in accordance with claim 13, further comprising:
compiling the first code, the second code, the first language version of the correlating code, and the second language version of the correlating code.

15. The method in accordance with claim 9, wherein the directive is associated with an attribute or keyword within either the first code or the second code.

16. The method in accordance with claim 9, the directive being a first directive, the first code further containing a third reference, and other code containing a fourth reference, the method further comprising:
as a result of analyzing, detecting a second directive that the third reference is to be correlated with the fourth reference so that they both refer to the same data, and that the third reference is of a compatible type as the fourth reference.

17. The method in accordance with claim 16, wherein the correlating code further is interpretable to a compiler as allowing the third reference to be resolved with type-checking as referring to the same data as the fourth reference.

18. The method in accordance with claim 16, wherein the correlating code is first correlating code correlating the first and second references, the method further comprising:
in response to the second directive, automatically generating second correlating code that is interpretable to the compiler as allowing the third reference to be resolved with type-checking as referring to the same data as the fourth reference.

19. The method in accordance with claim 16, wherein the other code is the same as the second code.

20. A method of performing build-time resolving and type checking of references, the method comprising:
analyzing, prior to compilation, front-end imperative code that contains a first reference to first data, the front-end imperative code composed in an imperative language;
analyzing, prior to compilation, back-end declarative code that contains a second reference to second data, the back-end declarative code composed in a declarative language, the first reference and the second reference being distinct and using different semantics;
detecting through the pre-compilation analysis of the front-end imperative code and back-end declarative code a directive that the first reference is to be correlated with the second reference so that the first reference to first data and the second reference to second data both refer to the same data;
in response to detecting the directive,
determining a type of the first reference and determining a second type of the second reference, and
determining that the type of the first reference and the second type of the second reference are compatible types;
in response to detecting the directive and determining that the type of the first reference and the second type of the second reference are compatible types:

a code generation tool automatically generating declarative correlating code in the declarative language that is interpretable by a compiler at a time the front-end imperative code, the back-end declarative code, and the generated declarative correlating code are input to and complied by the compiler as allowing a value of the type of the first reference of a compiled-form of the front-end imperative code to refer to the same data of the same type as the second reference of a compiled-form of the back-end declarative code; and automatically generating imperative correlating code in the imperative language that is also interpretable by the compiler at a time the front-end imperative code, the back-end declarative code, and the generated imperative correlating code are input to and complied by the compiler as allowing the a value of the type of first reference of a compiled-form of the front-end imperative code to refer to the same data of the same type as the second reference of a compiled-form of the back-end declarative code; and compiling each of the front-end declarative code, the back-end imperative code, the generated declarative correlating code, and the generated imperative correlating code.

* * * * *